US009566712B2

(12) United States Patent
Matsumoto et al.

(10) Patent No.: US 9,566,712 B2
(45) Date of Patent: Feb. 14, 2017

(54) SELF-PROPELLED ELECTRONIC DEVICE

(71) Applicant: Sharp Kabushiki Kaisha, Osaka-shi, Osaka (JP)

(72) Inventors: Masashi Matsumoto, Osaka (JP); Kazuhiro Miki, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 14/384,807

(22) PCT Filed: Mar. 12, 2013

(86) PCT No.: PCT/JP2013/056756
§ 371 (c)(1),
(2) Date: Sep. 12, 2014

(87) PCT Pub. No.: WO2013/168462
PCT Pub. Date: Nov. 14, 2013

(65) Prior Publication Data
US 2015/0039127 A1 Feb. 5, 2015

(30) Foreign Application Priority Data

May 7, 2012 (JP) .................................. 2012-106324

(51) Int. Cl.
*G05B 15/00* (2006.01)
*B25J 9/16* (2006.01)
(Continued)

(52) U.S. Cl.
CPC ............ *B25J 9/1697* (2013.01); *A47L 9/2805* (2013.01); *G08C 17/02* (2013.01); *G08C 23/04* (2013.01);
(Continued)

(58) Field of Classification Search
CPC combination set(s) only.
See application file for complete search history.

(56) References Cited

U.S. PATENT DOCUMENTS 5,442,346 A * 8/1995 Kim ...................... G08C 19/28
340/12.1
6,113,343 A * 9/2000 Goldenberg ............. B25J 5/005
239/587.2

(Continued)

FOREIGN PATENT DOCUMENTS

CN 101151614 A 3/2008
JP 2003-006532 A 1/2003
(Continued)

OTHER PUBLICATIONS

Official Communication issued in International Patent Application No. PCT/JP2013/056756, mailed on Apr. 23, 2013.

*Primary Examiner* — Jonathan L Sample
(74) *Attorney, Agent, or Firm* — Keating & Bennett, LLP

(57) ABSTRACT

In a self-propelled vacuum cleaner (1), a housing operation management section (51) and an image transmission control section (53) receive a stop instruction for stopping a transmission operation of an image from a user. In a case where the stop instruction is received, the image transmission control section (53) stops the transmission operation of the image and sets a command non-reception mode. Upon receipt of the stop instruction for stopping the transmission operation of the image, the command control section (56) notifies, to a login terminal device which has transmitted a command of the transmission operation of the image, that the command non-reception mode in which reception of the operation command from the login terminal device is refused has been set in the self-propelled vacuum cleaner 1.

5 Claims, 8 Drawing Sheets

(51) Int. Cl.
  *G08C 17/02* (2006.01)
  *G08C 23/04* (2006.01)
  *A47L 9/28* (2006.01)
  *H04M 1/725* (2006.01)

(52) U.S. Cl.
  CPC ...... *G08C 2201/42* (2013.01); *H04M 1/72533* (2013.01)

(56) References Cited

U.S. PATENT DOCUMENTS

| | | | | |
|---|---|---|---|---|
| 7,896,113 B1* | 3/2011 | Ramirez | ................ | B25J 5/005 180/9 |
| 7,904,182 B2* | 3/2011 | Hosek | ................ | G05B 19/4148 118/687 |
| 8,442,661 B1* | 5/2013 | Blackwell | ............. | B25J 9/1689 700/245 |
| 8,489,669 B2* | 7/2013 | Johnson | ............. | H04W 76/021 709/203 |
| 8,639,214 B1* | 1/2014 | Fujisaki | ................ | G06Q 20/32 379/88.03 |
| 8,676,273 B1* | 3/2014 | Fujisaki | ............. | H04M 1/6505 379/142.06 |
| 2002/0156556 A1* | 10/2002 | Ruffner | ................ | A01B 69/008 701/23 |
| 2003/0061380 A1* | 3/2003 | Saito | ................ | H04L 12/2803 709/238 |
| 2003/0216834 A1* | 11/2003 | Allard | ................ | B25J 9/1689 700/245 |
| 2005/0222933 A1* | 10/2005 | Wesby | ................ | G06Q 40/00 705/36 R |
| 2006/0045060 A1* | 3/2006 | Miyazaki | ............. | G05D 1/0274 370/338 |
| 2006/0056677 A1* | 3/2006 | Tani | ................ | G05D 1/0242 700/259 |
| 2006/0161303 A1* | 7/2006 | Wang | ................ | B25J 9/1689 700/259 |
| 2006/0235570 A1* | 10/2006 | Jung | ................ | G05D 1/0022 700/245 |
| 2007/0061041 A1* | 3/2007 | Zweig | ................ | G05D 1/0261 700/245 |
| 2007/0192910 A1* | 8/2007 | Vu | ............. | B25J 5/007 700/245 |
| 2008/0039974 A1* | 2/2008 | Sandin | ................ | G05D 1/028 700/258 |
| 2008/0121097 A1* | 5/2008 | Rudakevych | ............ | F41A 19/58 89/28.05 |
| 2009/0164123 A1* | 6/2009 | Moriguchi | ............ | G05D 1/0227 701/301 |
| 2009/0173561 A1* | 7/2009 | Moriguchi | ................ | B25J 5/007 180/167 |
| 2010/0063628 A1* | 3/2010 | Landry | ................ | A47L 11/4011 700/258 |
| 2010/0076600 A1* | 3/2010 | Cross | ................ | H04N 7/15 700/259 |
| 2011/0313568 A1* | 12/2011 | Blackwell | ................ | B25J 5/007 700/245 |
| 2012/0182392 A1* | 7/2012 | Kearns | ................ | B25J 11/009 348/46 |

FOREIGN PATENT DOCUMENTS

| | | |
|---|---|---|
| JP | 2003-111156 A | 4/2003 |
| JP | 2004-135040 A | 4/2004 |
| JP | 2005-118354 A | 5/2005 |
| JP | 2005-331128 A | 12/2005 |
| JP | 2006-061220 A | 3/2006 |

* cited by examiner

SELF-PROPELLED ELECTRONIC DEVICE

TECHNICAL FIELD

The present invention relates to a self-propelled electronic device which performs an operation in response to an operation from a terminal device.

BACKGROUND ART

Self-propelled vacuum cleaners which perform cleaning while travelling have become popular as electronic devices for ordinary households. Some of those self-propelled vacuum cleaners include cameras. By mounting a camera on a self-propelled vacuum cleaner, a user can cause the self-propelled vacuum cleaner to capture an image of an interior of a room while the user is absent and transmit an image thus captured to a designated terminal device via a communication network.

Regarding such a self-propelled vacuum cleaner on which a camera is mounted, Patent Literature 1 discloses that a camera is provided to be storable in a body of the self-propelled vacuum cleaner. This can ease a user's anxiety that, due to an operating error or malfunction, an image of an interior of a room is captured and is transmitted to an outside before the user is aware of that.

Patent Literature 2 discloses a configuration in which an operation instruction is given to a self-propelled vacuum cleaner by a remote control via a communication network.

As self-propelled electronic devices for ordinary households other than a vacuum cleaner, a self-propelled air cleaner (self-propelled air cleaning robot) for cleaning air in a room or other devices are proposed in Patent Literature 3.

CITATION LIST

Patent Literatures

Patent Literature 1
  Japanese Patent Application Publication, Tokukai, No. 2006-061220
Patent Literature 2
  Japanese Patent Application Publication, Tokukai, No. 2005-118354
Patent Literature 3
  Japanese Patent Application Publication, Tokukai, No. 2005-331128

SUMMARY OF INVENTION

Technical Problem

In recent years, as described in Patent Literature 2, a self-propelled electronic device such as a self-propelled vacuum cleaner is remotely controlled from an outside via a communication network. In a case where a camera is mounted on a self-propelled electronic device, capturing an image with use of a camera can be also performed by remote control. In this case, there is a possibility that an image of an interior of a room is captured and is transmitted to an outside or is stored in the self-propelled electronic device in response to an instruction from a third person before a user of the self-propelled vacuum cleaner is aware of that.

Such a behavior can be prevented by storing a camera in a body of a self-propelled vacuum cleaner like the configuration of Patent Literature 1. However, if the camera is only stored in the body so as not to capture an image, it is impossible to clearly notify, to a third person who tries to capture an image by remote control, that a person whose room is tried to be captured on the camera is aware of the behavior. Therefore, the third person only thinks that the image of the room could not be captured under some physical circumstances this time, and he/she may repeat the behavior.

Some self-propelled electronic devices include not only a camera but also a microphone. In a case of such a self-propelled electronic device, there is a possibility that a sound in a room is picked up and is transmitted to an outside or is stored in the self-propelled electronic device in response to an instruction from a third person before a user of the self-propelled electronic device is aware of that.

The present invention has been made in view of the problems, and an object of the present invention is to provide a self-propelled electronic device having any one of or both of a function of capturing an image with use of a camera and a function of picking up a sound with use of a microphone, in which self-propelled electronic device capturing an image or picking up a sound in an interior of a room by remote control from an outside can be effectively stopped.

Solution to Problem

In order to achieve the above object, a self-propelled electronic device of the present invention, which performs an operation in response to a command transmitted from a terminal device connected via a communication network, the self-propelled electronic device capable of performing (i) a data generation operation for obtaining an image in an image capturing section or sound in a sound pickup section and generating image data or sound data (ii) a data transmission operation for transmitting the image data or the sound data thus generated to the terminal device via the communication network, the self-propelled electronic device comprising: a stop instruction receiving section for receiving a stop instruction for stopping the data generation operation or the data transmission operation; a data control section for stopping the data generation operation or the data transmission operation when the stop instruction receiving section receives the stop instruction for stopping the data generation operation or the data transmission operation; and a notification section for, when the stop instruction receiving section receives the stop instruction for stopping the data generation operation or the data transmission operation, notifying, to a terminal device which has transmitted a command of the data generation operation or the data transmission operation, that a command non-reception mode in which reception of an operation command from the terminal device is refused has been set in the self-propelled electronic device.

According to the configuration, the stop instruction receiving section receives the stop instruction for stopping the data generation operation or the data transmission operation commanded from the terminal device. When the stop instruction receiving section receives the stop instruction of the data generation operation or the data transmission operation, the data control section stops the data generation operation or the data transmission operation to the terminal device and the notification section notifies, to the terminal device which has transmitted a command of the data generation operation or the data transmission operation, that a command non-reception mode in which reception of an operation command from the terminal device is refused has been set in the self-propelled electronic device.

This makes it possible to stop images and/or sounds around the self-propelled electronic device from being stored in forms of data or being transmitted to an outside without knowledge, and also to clearly notify, to the terminal device which has transmitted a command of the data generation operation or the data transmission operation, that the self-propelled electronic device refuses reception of the operation command from the terminal device. As a result, it is effectively possible to stop a possessor of the terminal device which has transmitted a command of the data transmission operation from performing similar behavior.

Advantageous Effects of Invention

According to the present invention, in the self-propelled electronic device having functions of capturing an image on a camera, picking up a sound with use of a microphone, and/or the like, it is effectively possible to stop a remote control from an outside from capturing an image or picking up a sound in an interior of a room.

Figure 7:
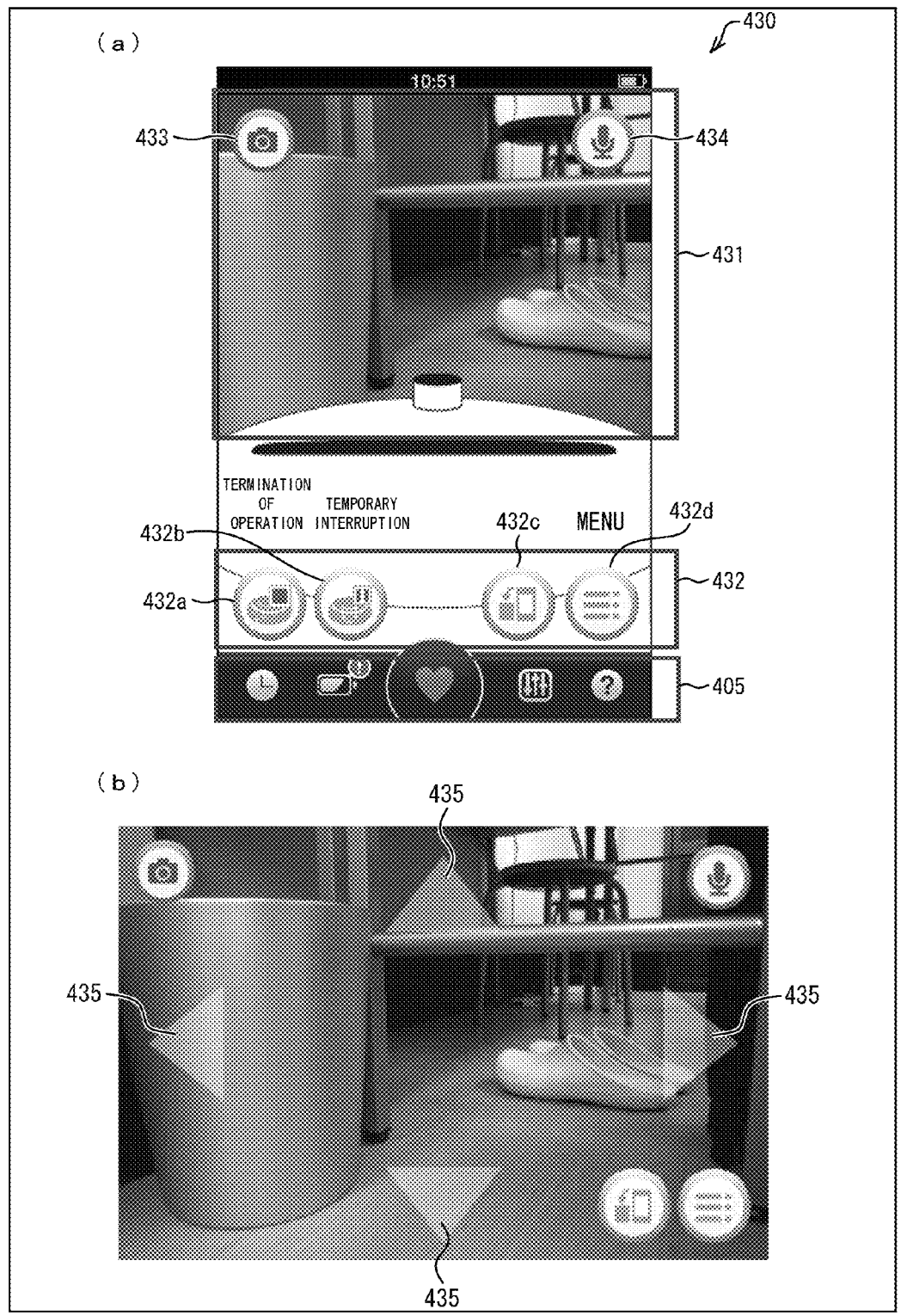

Both (a) and (b) of FIG. 7 show examples of an image capturing screen 430 displayed on a login terminal device 200 in a case where the login terminal device 200 has transmitted an instruction of an image transmission mode to a self-propelled vacuum cleaner 1.

Figure 8:
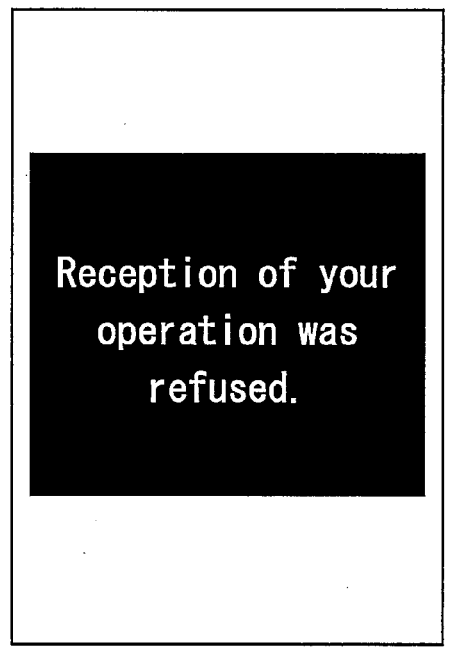

FIG. 8 is a view illustrating an example screen which is displayed on a display screen of a login terminal device by notifying, to the login terminal device, that a command non-reception mode has been set.

DESCRIPTION OF EMBODIMENTS

The following description will discuss an embodiment according to the present invention with reference to drawings.

Figure 2:
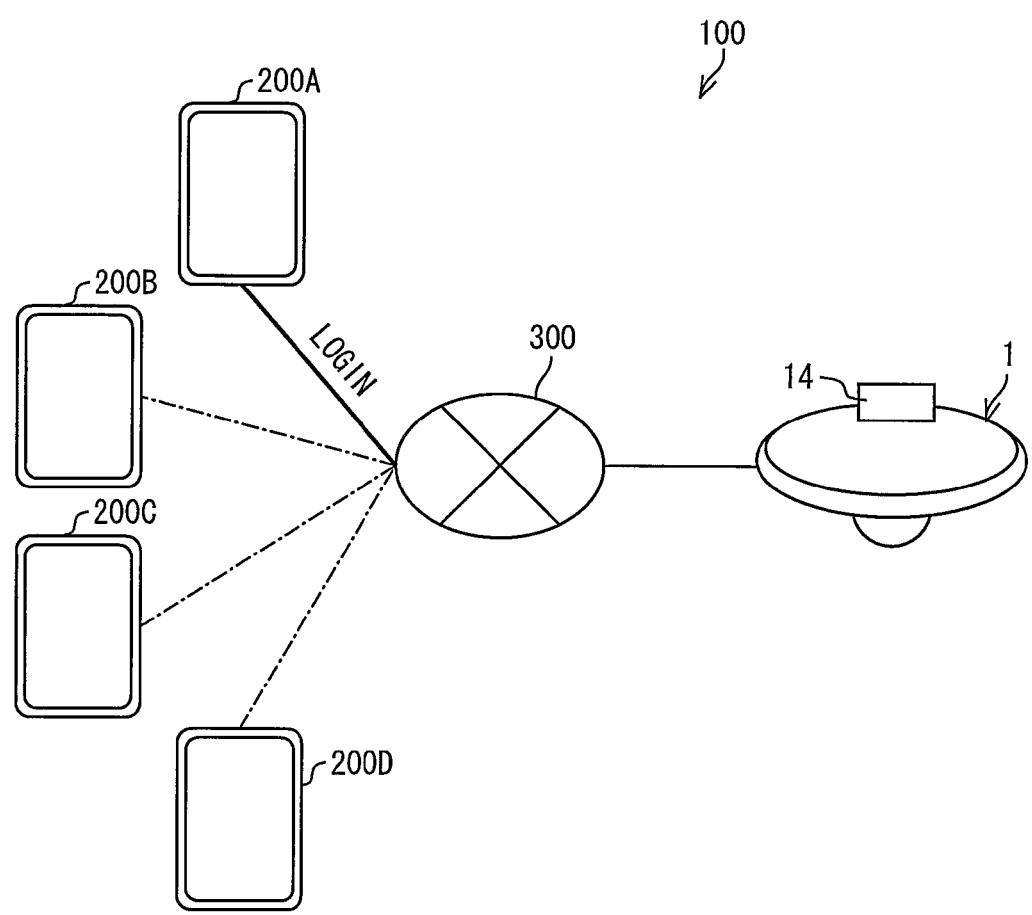
FIG. 2 is a schematic view illustrating an example configuration of an operation system of a self-propelled vacuum cleaner of an embodiment according to the present invention.

FIG. 2 is a schematic view illustrating an example configuration of an operation system 100 of a self-propelled vacuum cleaner of this embodiment. As illustrated in FIG. 2, the operation system 100 includes a self-propelled electronic device 1, terminal devices 200A to 200D, and a communication network 300.

Figure 1:
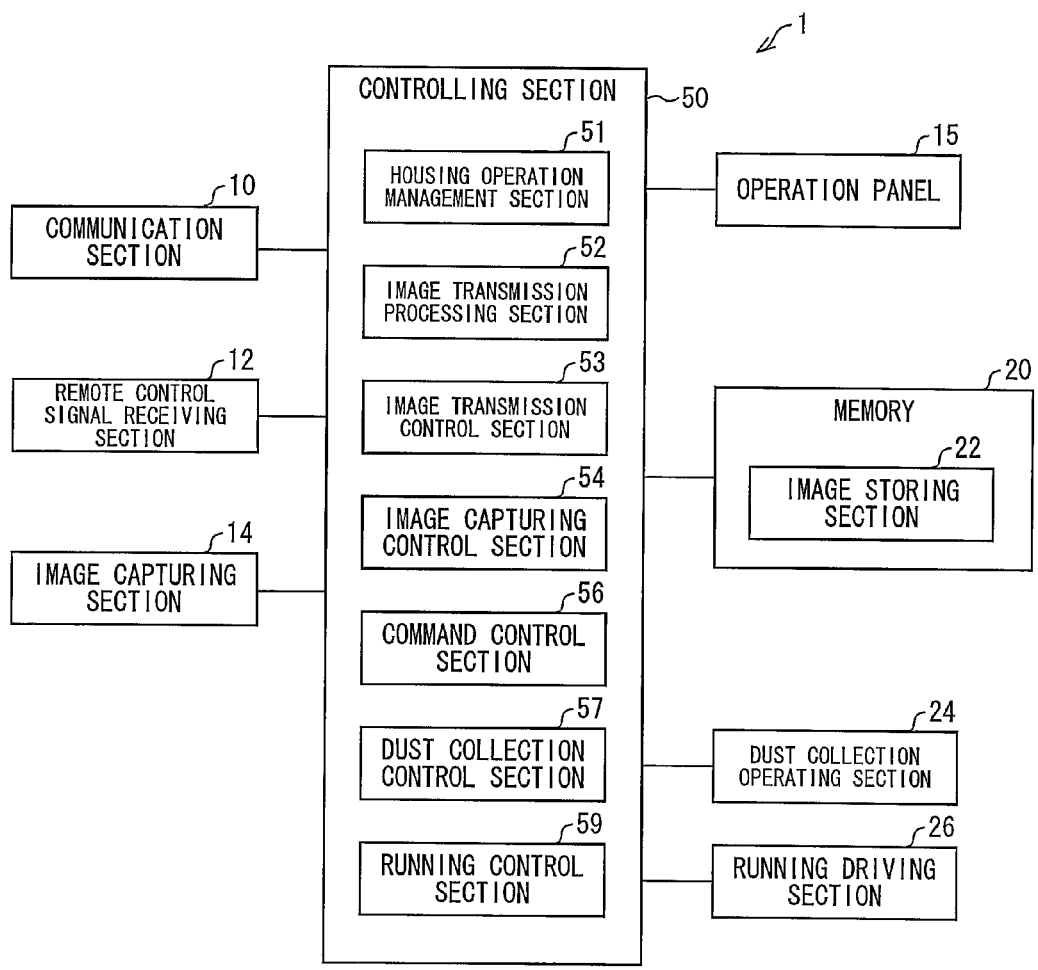
FIG. 1 is a function block diagram illustrating a configuration of a main part of a self-propelled vacuum cleaner of an embodiment according to the present invention.

The self-propelled electronic device 1 is, for example, a self-propelled vacuum cleaner which performs cleaning while travelling or a self-propelled air cleaner disclosed in Patent Literature 3. FIG. 1 exemplifies a self-propelled vacuum cleaner, and the following description will discuss a self-propelled vacuum cleaner as a specific example of the self-propelled electronic device 1.

The self-propelled vacuum cleaner 1 includes a running driving section for self-propelling, a dust collection operating section for collecting dust, an image capturing section 14 for capturing an image of a surrounding environment of the self-propelled vacuum cleaner 1, and the like. The image capturing section 14 captures images such as moving images, still images, or sequence still images and generates image data (data generation) of the images, and is constituted of an optical lens, a color filter, a CCD (Charge Coupled Device) which is a light receiving element, etc. An image captured by the image capturing section 14 is processed in an image transmission processing section 52 described later, and is transmitted to the terminal device 200A, 200B, 200C, or 200D. The self-propelled vacuum cleaner 1 includes a secondary battery (not shown) therein, and sections such as the running driving section, the dust collection operating section, and the image capturing section 14 are operated by supply of an electric power from the secondary battery.

The terminal devices 200A to 200D are, for example, smartphones, tablet terminal, or mobile phones. The terminal device 200A to 200D can operate the self-propelled vacuum cleaner 1 in such a manner that, by connecting the terminal device 200A to 200D to the self-propelled vacuum cleaner 1 via the communication network 300 and performing two-way communication between the terminal device 200A to 200D, an operation command is transmitted to the self-propelled vacuum cleaner 1 from the terminal device 200A to 200D. The self-propelled vacuum cleaner 1 and the terminal device 200A to 200D are associated with each other, which is called pairing, in order to operate the self-propelled vacuum cleaner 1.

In an example of FIG. 2, the self-propelled vacuum cleaner 1 is paired with the four terminal devices 200A to 200D. Each of the four terminal devices 200A to 200D can operate the self-propelled vacuum cleaner 1, however, a plurality of terminal devices 200 cannot simultaneously operate the self-propelled vacuum cleaner 1. Among the terminal devices 200A to 200D which have tried to connect to the self-propelled vacuum cleaner 1, only one terminal device which obtains first an operation right of the self-propelled vacuum cleaner 1 can operate the self-propelled vacuum cleaner 1. Hereinafter, among the terminal devices 200A to 200D, the terminal device 200 which has the operation right of the self-propelled vacuum cleaner 1 is referred to as "login terminal device". In the example of FIG. 2, the terminal device 200A has the operation right of the self-propelled vacuum cleaner 1. In a case where there is no need to discriminate the terminal devices 200A to 200D in particular, the terminal devices are only referred to as "terminal device 200".

The communication network 300 is not particularly limited. Examples of the communication network 300 encompasses internet, intranet, extranet, LAN, ISDN, VAN, CATV communication network, virtual private network, telephone network, mobile communication network, satellite communication network, etc. Further, a transmission medium constituting the communication network 300 is not particularly limited, and examples of the transmission medium encompass: wired transmission media such as IEEE1394, USB, power-line carrier, cable TV line, telephone line, and ADSL; and wireless transmission media such as infrared rays (e.g., IrDA and a remote controller), Bluetooth (registered trademark), WiFi (registered trademark), ZigBee (registered trademark), IEEE802.11 wireless, HDR (High Data Rate), NFC (Near Field Communication), DLNA (Digital Living Network Alliance), cell-phone network, satellite line, digital terrestrial network, etc.

FIG. 1 is a function block diagram illustrating a configuration of a main part of the self-propelled vacuum cleaner 1. As shown in FIG. 1, the self-propelled vacuum cleaner 1 includes a dust collection operating section 24, a running driving section 26, an operation panel 15, a communication section 10, a remote control signal receiving section 12, an image capturing section 14, a controlling section 50, and a memory 20.

The dust collection operating section 24 absorbs dust and trash to collect them, which is a main function as a vacuum cleaner. The dust collection operating section 24 includes an absorption device (not shown) for generating a power of absorption, a cleaning brush (not shown), etc.

The running driving section 26 moves the self-propelled vacuum cleaner 1, and is constituted of wheel, roller, or the like. The running driving section 26 can move the self-propelled vacuum cleaner 1 forward or backward in a parallel direction while maintaining a direction of the self-propelled vacuum cleaner 1 and can rotate the self-propelled vacuum cleaner 1 while changing the direction of the self-propelled vacuum cleaner 1, for example.

The operation panel 15 is a user interface (UI) of a housing, and includes an operating section for inputting various instruction to the self-propelled vacuum cleaner 1 and a display section for displaying various kinds of information. The operating section provides a plurality of operation buttons.

The communication section 10 transmits/receives data to/from the terminal device 200 via the communication network 300 (see FIG. 2). The communication section 10 transmits data stored in the self-propelled vacuum cleaner 1 to the terminal device 200 at the time of login, or receives data for login from the terminal device 200. After the login, the communication section 10 receives, only from the login terminal device 200, an operation signal for operating the self-propelled vacuum cleaner 1, and transmits, only to the login terminal device, data (including an image captured by the image capturing section 14) which has been obtained by the self-propelled vacuum cleaner 1.

The remote control signal receiving section 12 receives a remote control signal transmitted from an infrared radiation remote controller (not shown) in order to operate the self-propelled vacuum cleaner 1. The self-propelled vacuum cleaner 1 can be operated not only by the terminal device 200 via the communication network 300 but also by a remote controller. The infrared radiation remote controller provides operation buttons for inputting various instructions to the self-propelled vacuum cleaner 1, and, when an operation button is pushed, a remote control signal associated with the operation button is outputted.

The controlling section 50 collectively controls sections of the self-propelled vacuum cleaner 1 on the basis of a program or data stored in the memory 20 or a program or data inputted from the login terminal device 200 which is connected to the network. By executing a program, a dust collection control section 57, a running control section 59, an image-capturing control section 54, a housing operation management section 51, an image transmission processing section 52, an image transmission control section 53, and a command control section 56 are constituted in the controlling section 50.

The dust collection control section 57 controls the dust collection operating section 24, the running control section 59 controls the running driving section 26, and the image-capturing control section 54 controls the image capturing section 14.

In an image transmission mode in which an image of a surrounding environment is captured with use of the image capturing section 14 and is transmitted to an outside, the image transmission processing section 52 transmits the image captured by the image capturing section 14 to the communication section 10 via the communication network 300. The image transmission processing section 52 converts the image captured by the image capturing section 14 to an appropriate signal for being transmitted via the communication network 300. The image transmission processing section 52 sets image transmission state information indicating a state of transmitting the image such that the image transmission state information is "active" while the image is being transmitted and is "inactive" when the image is not transmitted. The image transmission state information is sent to the image transmission control section 53 and the command control section 56.

The housing operation management section 51 receives an operation instruction from a user with use of the operation panel 15 and the infrared radiation remote controller. A signal associated with a button operated on the operation panel 15 is inputted to the housing operation management section 51, and a signal associated with a button operated on the infrared radiation remote controller is inputted via the remote control signal receiving section 12.

By inputting the signal associated with the button thus operated, the housing operation management section 51 detects that an operation instruction has performed by the user, and sends, to corresponding sections including the image transmission control section 53, operation information associated with the button thus operated.

The image transmission control section 53 analyzes contents of the operation information inputted from the housing operation management section 51, and, in a case where the operation information is information of an operation which is instructed by the user to stop image transmission, the image transmission processing section 52 further obtains the image transmission state information. In a case where the state information indicates that the image is being sent, the image transmission control section 53 transmits an instruction for stopping image transmission to the image transmission processing section 52. The image transmission control section 53 not only transmits the instruction for stopping image transmission to the image transmission processing section 52 but also sets a command non-reception mode in which the command control section 56 does not receive commands for a predetermined period.

Meanwhile, in a case where the operation information is not information of an operation which is instructed by the user to stop image transmission or the image transmission state information indicates that the image is not being sent even if the operation information is information of an operation which is instructed by the user to stop image transmission, the image transmission control section 53 does not transmit the instruction for stopping the image transmission to the image transmission processing section 52 or set the command non-reception mode.

In this embodiment, in a case where any operation button on the operation panel 15 is operated in a state in which the self-propelled vacuum cleaner 1 is logged in the terminal device 200, the image transmission control section 53 determines that the operation is information of an operation which is instructed by the user to stop image transmission. In other words, even if a content of the operation information, inputted from the housing operation management section 51, indicates pushing an operation button for instructing start of motion of the self-propelled vacuum cleaner 1, the image transmission control section 53 performs an operation as if it has received an instruction for stopping image transmission in place of an instruction for starting the motion of the self-propelled vacuum cleaner 1. Similarly, in a case where one of the operation buttons on the infrared radiation remote controller is operated in a state in which the self-propelled vacuum cleaner 1 is logged in the terminal device 200, the image transmission control section 53 determines that the operation is information of an operation which is instructed by the user to stop image transmission. In other words, even if a content of the operation information, inputted from the housing operation management section 51, indicates pushing an operation button for instructing stop of motion of the self-propelled vacuum cleaner 1, the image transmission control section 53 performs an operation as if it has received an instruction for stopping image transmission in place of an instruction for stopping the motion of the self-propelled vacuum cleaner 1.

The housing operation management section 51 and the image transmission control section 53 constitute a stop instruction receiving section in the self-propelled electronic device of the present invention. The image transmission control section 53 constitutes a data control section in the self-propelled electronic device of the present invention.

The operation which is instructed by the user to stop image transmission is set so that the operation is operated by pushing any operation button on the operation panel 15 and the infrared radiation remote controller. Therefore, by pushing any operation button on the operation panel 15 and the infrared radiation remote controller, the user can quickly stop transmitting the image.

In this embodiment, when a predetermined time period is passed after the command non-reception mode has been set, the image transmission control section 53 releases the command non-reception mode and therefore can receive the operation command from the login terminal device 200. This is a measure when the command non-reception mode is set by an operating error, i.e., by touching an operation button of the operation panel 15 or the infrared radiation remote controller by mistake.

The command control section 56 obtains an operation command received via the communication section 10. In a case where the command non-reception mode is set in the image transmission control section 53, the command control section 56 does not execute an operation commanded by the operation command, but transmits, to the terminal device 200 which has sent the operation command via the communication section 10, a response of refusing reception of the operation command. Meanwhile, in a case where the command non-reception mode is not set, the command control section 56 transmits instructions to sections for executing the operation commanded by the operation command. The command control section 56 constitutes a notification section in the self-propelled electronic device of the present invention.

The memory 20 stores various programs that the controlling section 50 executes, various kinds of data used or formed when the various programs are executed, and various kinds of data inputted to the self-propelled vacuum cleaner 1. The memory 20 is constituted of a non-volatile storage device, such as ROM, flash memory, EPROM, EEPROM (registered trademark), or HDD, and a volatile storage device, such as RAM, constituting a work area.

The memory 20 includes an image storing section 22 for storing image data of the image captured by the image capturing section 14. The image transmission processing section 52 reads out the image data from the image storing section 22 and transmits the image data via the communication section 10.

Figure 3:
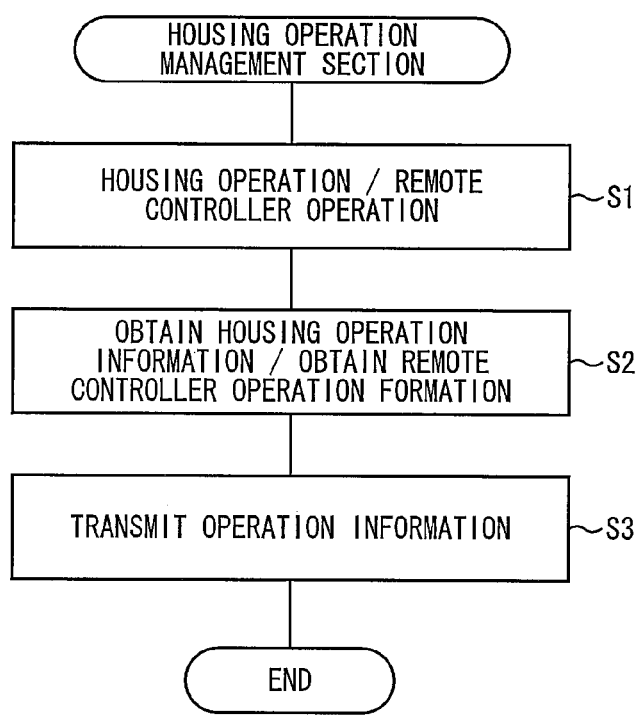
FIG. 3 is a flowchart showing a flow of processing in which a housing operation management section of the self-propelled vacuum cleaner obtains operation information and transmits the operation information.

FIG. 3 is a flowchart showing a flow of processing in which the housing operation management section 51 obtains operation information and transmits the operation information.

A user operates the operation panel (housing UI) 15 of the self-propelled vacuum cleaner 1 or the infrared radiation remote controller (S1). The housing operation management section 51 obtains operation information in response to an instruction associated with a pushed operation button of the operation panel 15 or the infrared radiation remote controller (S2). The housing operation management section 51 transmits the operation information thus obtained to sections including the image transmission control section 53 (S3). Such processes are carried out every time when the user operates the operation panel 15 or the infrared radiation remote controller.

Figure 4:
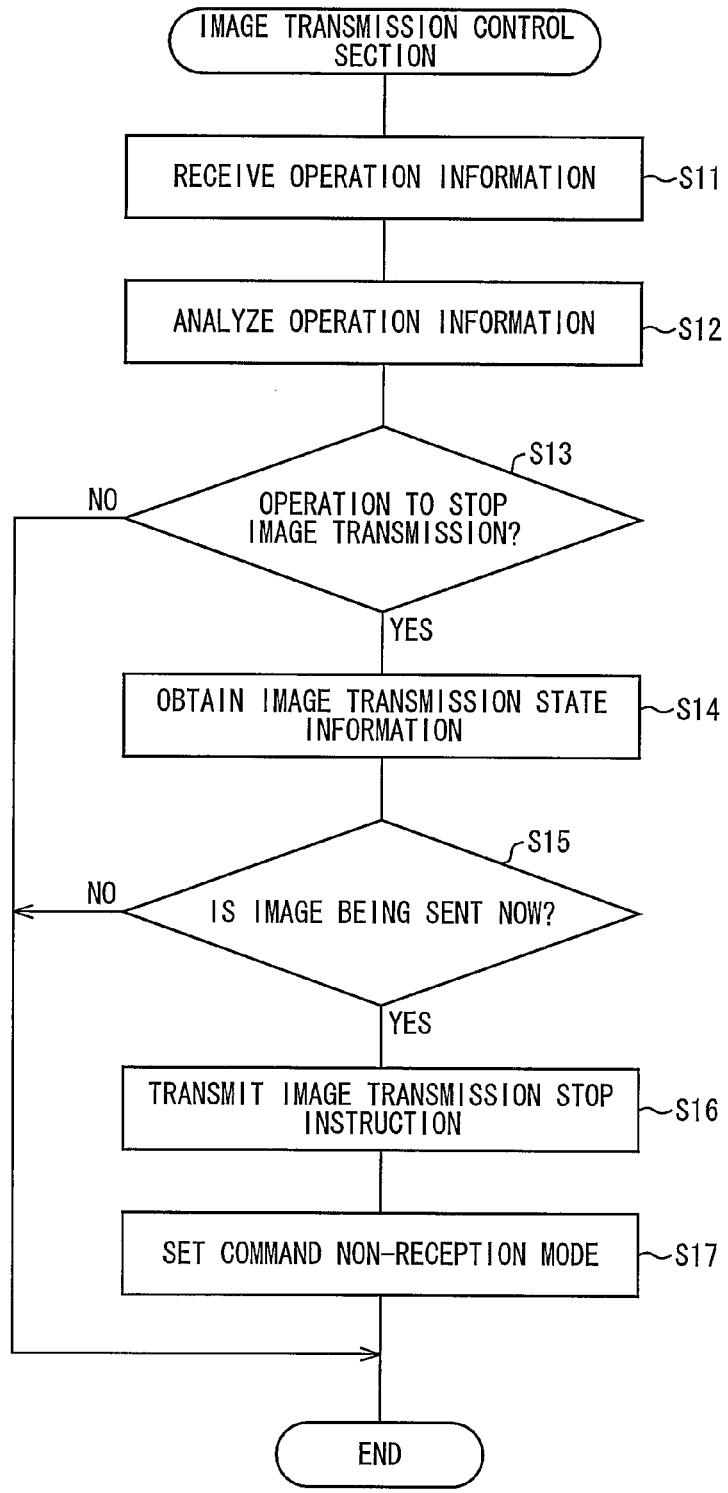
FIG. 4 is a flowchart showing a flow of processing in which an image transmission control section of the self-propelled vacuum cleaner controls image transmission in response to a refusing operation by a user.

FIG. 4 is a flowchart showing a flow of processing in which the image transmission control section 53 controls image transmission in response to a refusing operation by a user.

Upon receipt of the operation information from the housing operation management section 51 (S11), the image transmission control section 53 analyzes whether or not the operation information is information of an operation which is instructed to stop image transmission based on the refusing operation of the user (S12), and the processing proceeds to S13.

In a case where the operation information is not the information of the operation which is instructed to stop image transmission on the basis of analysis in S12, the processing is terminated in S13. Meanwhile, in a case where the operation information is the information of the operation which is instructed to stop image transmission, the image transmission control section 53 obtains the image transmission state information from the image transmission processing section 52 (S14), and the processing proceeds to S15.

In a case where the state information is "inactive" which means the image is not transmitted on the basis of the image transmission state information obtained in S14, the processing is terminated in S15. Meanwhile, in a case where the state information is "active" which means the image is being transmitted, an instruction for stopping image transmission is transmitted to the image transmission processing section 52 (S16), and the command non-reception mode is set (S17). Such processes are carried out every time when operation information is inputted from the housing operation management section 51.

Figure 5:
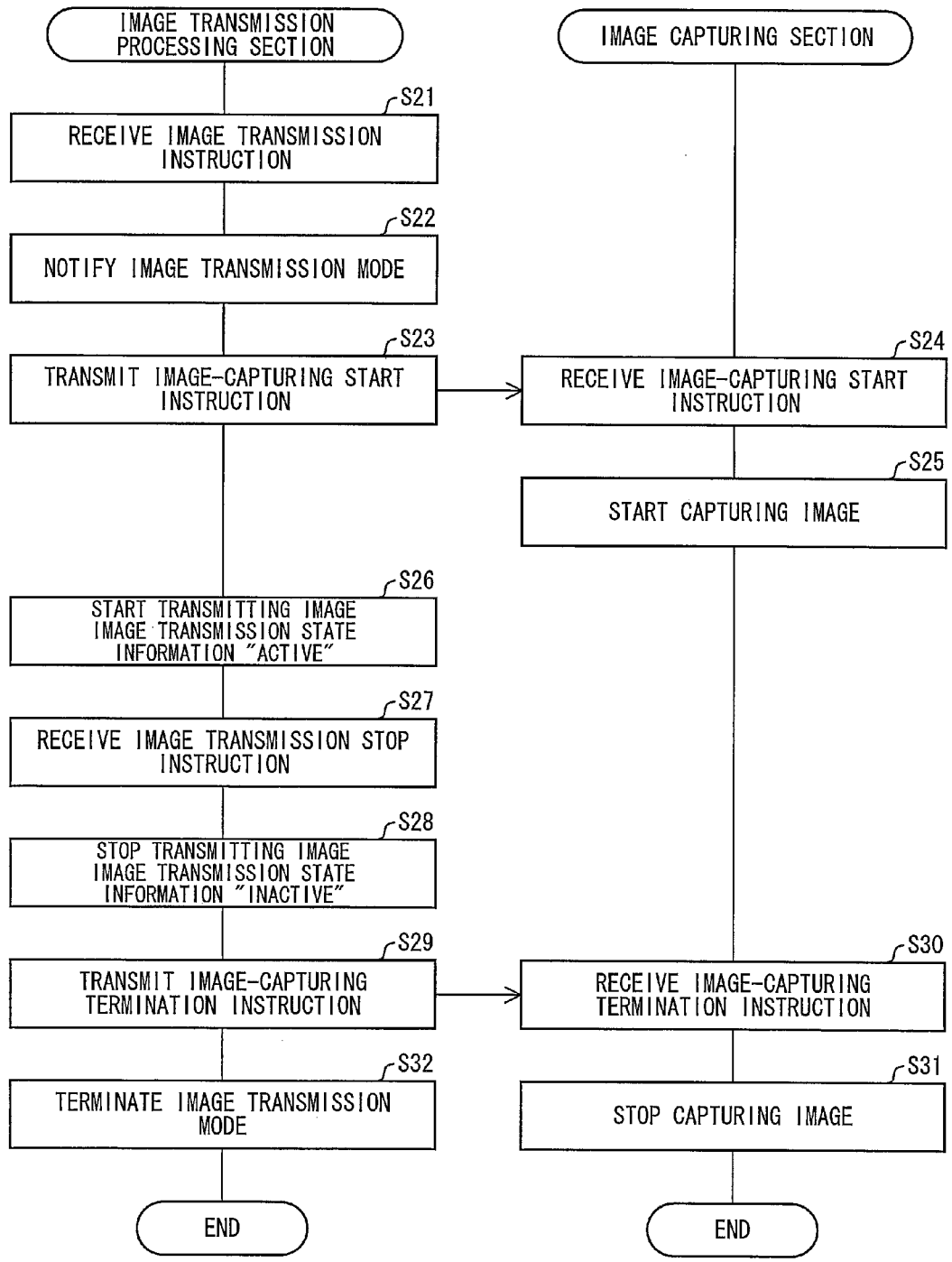
FIG. 5 is a flowchart showing a flow of processing performed in a case where a user performs a refusing operation in a state in which an image transmission processing section of the self-propelled vacuum cleaner is sending, to an outside, an image which has been captured in an image transmission mode by an image capturing section of the self-propelled vacuum cleaner.

FIG. 5 is a flowchart showing a flow of processing performed in a case where a user performs a refusing operation in a state in which the image transmission processing section 52 is sending, to an outside, an image which has been captured in an image transmission mode by the image capturing section 14.

Upon receipt of an image transmission instruction from the login terminal device 200A (S21), the image transmission processing section 52 turns on a predetermined lamp in order to notify to the user that the image transmission mode in which the image is captured and is sent to an outside is being executed (S22). Next, the image transmission processing section 52 transmits an image-capturing start instruction to the image capturing section 14 via the image-capturing control section 54 (S23).

Upon receipt of the image-capturing start instruction (S24), the image capturing section 14 starts to capture an image of a surrounding environment (S25). Note that, although not described in detail in this embodiment, it is also possible not only to capture an image with use of the image capturing section 14 but also to change an image-capturing range by changing the direction of the self-propelled vacuum cleaner 1 with use of the running control section 59 and the running driving section 26.

When the image capturing section 14 starts to capture an image and stores the image thus captured in the form of image data, the image transmission processing section 52 reads out the image data and converts a format of the image data to a format suitable for transmission, and starts to transmit the image (S26). At the same time, the image transmission state information is set to "active".

In this state, when the user performs the refusing operation with use of the operation panel 15 or the infrared radiation remote controller, the image transmission control section 53 outputs an image transmission stop instruction, and, upon receipt of the image transmission stop instruction (S27), the image transmission processing section 52 stops the image transmission (S28). At the same time, the image transmission state information is set to "inactive" (S28). Thereafter, the image transmission processing section 52 transmits an image-capturing termination instruction to the image capturing section 14 via the image-capturing control section 54 (S29). Upon receipt of the image-capturing termination instruction (S30), the image capturing section 14 terminates capturing an image (S31). The image transmission processing section 52 terminates notification of a state in which the image transmission mode is being executed (S32).

Figure 6:
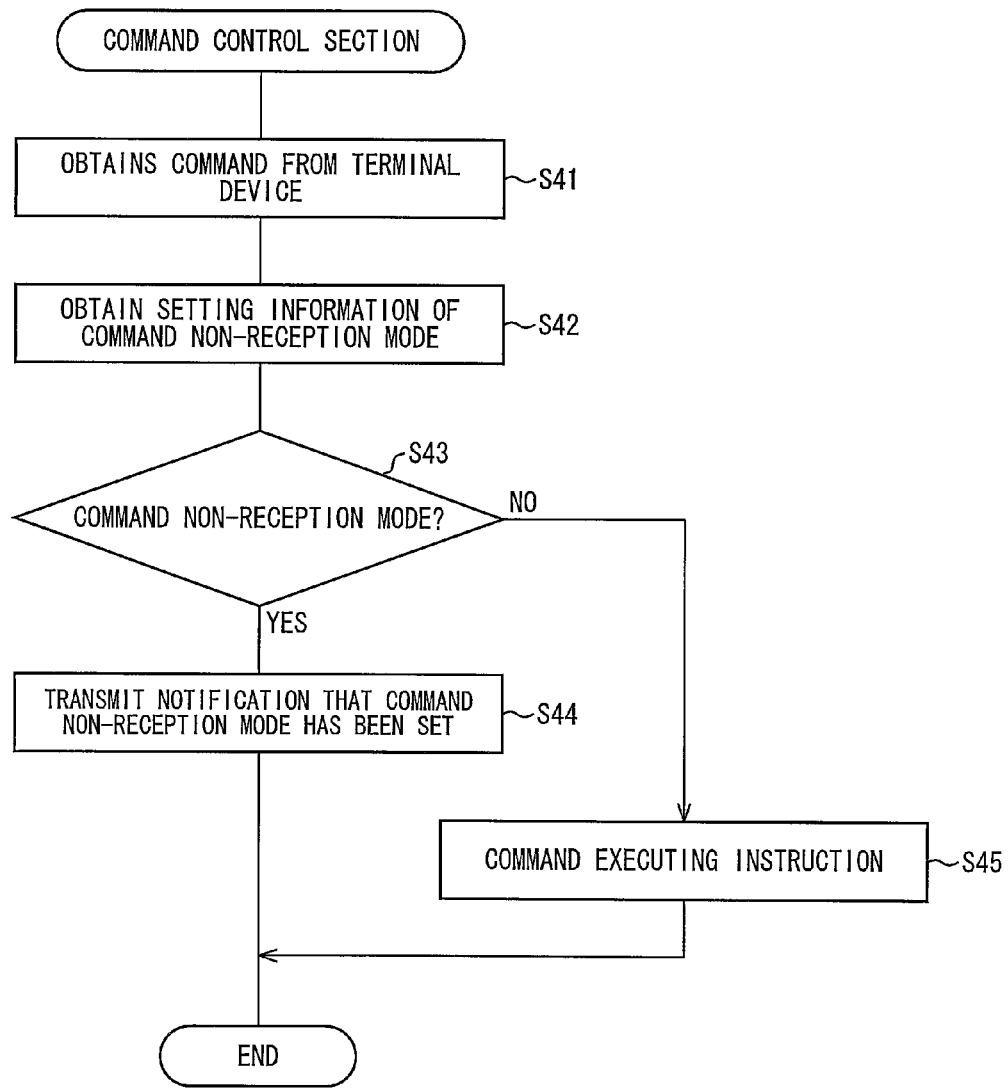
FIG. 6 is a flowchart showing a flow of processing performed in a case where a command control section of the self-propelled vacuum cleaner obtains an operation command from a login terminal device.

FIG. 6 is a flowchart showing a flow of processing performed in a case where the command control section 56 obtains an operation command from the login terminal device 200.

When the command control section 56 obtains the operation command from the login terminal device 200 via the communication section 10 (S41), the command control section 56 obtains setting information of the command non-reception mode, which setting information indicates whether or not the image transmission control section 53 sets the command non-reception mode (S42).

In a case where the command non-reception mode is not set, the processing proceeds to S45 and an instruction for executing the operation command received in S41 is transmitted. Meanwhile, in a case where the command non-reception mode is set, the processing proceeds to S44, and a notification that the command non-reception mode has been set is transmitted via the communication section 10 to the login terminal device 200 which has transmitted the operation command received in S41. Such processes are carried out every time when the operation command is received from the login terminal device 200A.

Note that the notification that the command non-reception mode is set is transmitted only when the login terminal device 200 is the login terminal device 200 which has transmitted first a command of the image transmission mode indicating stop of image transmission, and the processing of FIG. 6 is not carried out in a case where another terminal device 200 newly logs in. Recognition of the terminal device 200 is carried out by an IP address or the like.

Both (a) and (b) of FIG. 7 show examples of an image capturing screen 430 displayed on the login terminal device 200 in a case where the login terminal device 200 has transmitted an instruction of an image transmission mode to the self-propelled vacuum cleaner 1. The screen 430 is a screen for displaying an image captured by the self-propelled vacuum cleaner 1 in real time and giving an executable instruction to the self-propelled vacuum cleaner 1. The image capturing screen 430 has an image display area 431, a menu display area 432, and a setting button display area 405 for performing various kinds of setting.

The image display area 431 displays an image captured by the image capturing section 14 of the self-propelled vacuum cleaner 1, such as a streamed moving image, a still image, and serial still images. A shutter button 433 and a microphone button 434 are further displayed in the image display area 431.

When the shutter button 433 is tapped, a command which instructs the image capturing section 14 to capture a still image is transmitted to the self-propelled vacuum cleaner 1. Then, the still image thus captured is obtained from the self-propelled vacuum cleaner 1 and is stored in the memory of the terminal device 200.

When the microphone button 434 is tapped, a command having an instruction for outputting, from a sound outputting section of the self-propelled vacuum cleaner 1, sound inputted through a sound inputting section of the terminal device 200, is transmitted to the self-propelled vacuum cleaner 1, and the sound inputted from the sound inputting section is also transmitted to the self-propelled vacuum cleaner 1.

The menu display area 432 includes a termination button 432a, a temporary interruption button 432b, a screen vertically and horizontally switching button 432c, and a menu button 432d. Note that the temporary interruption button 432b is displayed only while the image capturing section 14 is capturing an image.

When the termination button 432a is tapped, a command having an instruction for terminating capturing of an image is transmitted to the self-propelled vacuum cleaner 1. When the temporary interruption button 432b is tapped, a command having an instruction for temporarily interrupting capturing of an image is transmitted to the self-propelled vacuum cleaner 1. Note that, when capturing of an image is temporarily interrupted, a temporarily interrupting screen which displays capturing of an image is temporarily interrupted is transferred, and, when an operation restart button is tapped on the temporarily interrupting screen, a command having an instruction for restarting a temporarily interrupted operation is sent to the self-propelled vacuum cleaner 1 and the screen is transferred to the image capturing screen 430.

When the screen vertically and horizontally switching button 432c is tapped, vertical screen display shown in (a) of FIG. 7 and horizontal screen display shown in (b) of FIG. 7 are switched. In the image capturing screen 430 which is a horizontal screen, images denoting vertical and horizontal arrows 435 are superimposed on an image within a screen. When one of the arrows 435 is tapped, a command having an instruction of a moving direction of the self-propelled vacuum cleaner 1 is transmitted to the self-propelled vacuum cleaner 1. When the menu button 432d is tapped, a sub menu is displayed in a pop-up form.

As described above, an image of an interior of a room in which the self-propelled vacuum cleaner 1 is placed is displayed on the display screen of the login terminal device 200 realistically.

FIG. 8 is a view illustrating an example screen which is displayed on the display screen of the login terminal device 200 by responding, to the login terminal device 200 which has instructed the self-propelled vacuum cleaner 1 to perform an image transmission mode, that a command non-reception mode has been set.

For example, a terminal possessor who possesses one of the terminal devices 200A to 200D paired to the self-propelled vacuum cleaner 1 executes an image transmission mode by operating the self-propelled vacuum cleaner 1 and receives a transmitted image before the user of the self-propelled vacuum cleaner 1 is aware of that. When the user of the self-propelled vacuum cleaner 1 notices such a behavior, image transmission of the self-propelled vacuum cleaner 1 is stopped by pushing an arbitrary operation button of the operation panel 15 or the infrared radiation remote controller. When the image transmission is stopped, the terminal possessor determines that the transmission is stopped due to a trouble at the time of the transmission, and transmits an operation command for instructing the image transmission mode again to the self-propelled vacuum cleaner 1. At this time, a response to notify that the command non-reception mode has been set is transmitted from the self-propelled vacuum cleaner 1 and a message illustrated in FIG. 8 is displayed on the display screen of the login terminal device 200.

In this case, it is possible not only to merely stop image transmission, but also to clearly notify to the terminal possessor that the user of the self-propelled vacuum cleaner 1 recognizes the operation by the terminal possessor and refuses the operation. As a result, it is possible to strongly prevent the terminal possessor from performing a similar operation.

Note that, with the configuration in the self-propelled vacuum cleaner 1, image data of an image captured by the self-propelled vacuum cleaner 1 is stored in the image storing section 22 of the memory 20 included in the self-propelled vacuum cleaner 1, however, the data may be stored in a server connected to the communication network 30. In this case, the image transmission control section 53 stops transmission of the image data to the server or the like from the self-propelled vacuum cleaner 1.

In the self-propelled vacuum cleaner 1, a command of the image transmission mode (data transmission operation) from the terminal device 200 is written as a mode to be refused by a user. However, an object to be transmitted to an outside is not only images but also sounds. That is, in a self-propelled vacuum cleaner on which a microphone (sound pickup section, sound pickup function) is mounted, it is possible to effectively prevent a third person who is not in a room from listening conversations or sounds in the room without permission by applying a similar configuration to a command of a sound-pickup transmission mode (data transmission operation) in which conversations or sounds in the room in which the self-propelled vacuum cleaner is placed are transmitted.

Further, the above embodiment has explained a case where the self-propelled vacuum cleaner 1 stops a transmission process of data of, for example, an image in response to an instruction for stopping transmission of the data from a user. However, the self-propelled vacuum cleaner 1 may be set to stop a generation process of data in response to an instruction for stopping generation of the data from a user.

In this case, for example, the housing operation management section 51 and the image transmission control section 53 constitute a stop instruction receiving section in the self-propelled electronic device of the present invention. Further, for example, the image-capturing control section 54 constitutes a data control section of the self-propelled electronic device in the present invention. This makes it possible to prevent data from being stored in the memory 20 of the self-propelled vacuum cleaner 1, if not being transmitted, before a user of the self-propelled vacuum cleaner 1 is aware of that. In a case where a command of the data transmission operation is transmitted from the terminal device 200 to the self-propelled vacuum cleaner 1, even if the generation process of data is stopped, it is possible to prevent a terminal possessor of the terminal device 200 from obtaining desired data.

The self-propelled vacuum cleaner 1 may be configured such that, by providing, on the operation panel 15 or on the infrared radiation remote controller, an operation button for not receiving an operation command of the image transmission mode and/or an sound-pickup transmission mode to the self-propelled vacuum cleaner from the terminal device 200, the self-propelled vacuum cleaner 1 does not receive an operation command of the image transmission mode and/or the sound-pickup transmission mode in a first and responds, to a terminal possessor of the terminal device 200, the message indicating that the operation is refused when the operation button is pushed.

The self-propelled electronic device of the present invention may be also configured such that, in a case where the stop instruction is received by the stop instruction receiving section while the data generation operation or the data transmission operation is being executed, the data control section stops the data generation operation or the data transmission operation.

The self-propelled electronic device of the present invention may be also configured such that the stop instruction is received by the stop instruction receiving section by operating an arbitrary button provided in the housing of the self-propelled electronic device or the stop instruction is received by the stop instruction receiving section by operating an arbitrary button provided in a remote controller of the self-propelled electronic device.

By configuring the self-propelled electronic device as described above, a user of the self-propelled electronic device can rapidly transmit an instruction for stopping a data transmission operation only by operating an arbitrary button provided on the housing of the self-propelled electronic device or by operating an arbitrary button provided on an remote controller.

The self-propelled electronic device of the present invention may be also configured such that, upon receipt of a next command from a terminal device which has transmitted a command of the data generation operation or the data transmission operation, the notification section transmits a response that the command non-reception mode has been set.

For example, it is considered that, when transmission of data from the self-propelled electronic device is stopped, a possessor of a terminal device who has transmitted a command of the data transmission operation requests the operation command again to the self-propelled electronic device. In such a case, by transmitting, as a response to the operation command, a response that reception of the operation command from the terminal device is refused by a self-propelled electronic device side, it is possible to more effectively stop the terminal possessor of the terminal device who has transmitted a command of the data transmission operation from performing a similar operation.

Finally, the controlling section 50 of the self-propelled vacuum cleaner 1 may be realized by a logic circuit (hardware) provided in an integrated circuit (IC chip) or the like or may be realized by software as executed by a CPU (Central Processing Unit).

Specifically, the self-propelled vacuum cleaner 1 includes a CPU (central processing unit) which carries out a command of a control program for realizing functions, a ROM (read only memory) which stores the program, a RAM (random access memory) which develops the program, and a storage apparatus (recording medium), such as a memory, which stores the program and various kinds of data. Further, the object of the present invention can be also realized in such a manner that: a recording medium is provided to the self-propelled vacuum cleaner 1, which recording medium has stored program codes (execution mode program, intermediate code program, and source program) (serving as software for realizing the aforementioned functions) of a control program in the self-propelled vacuum cleaner 1 so as to be readable by a computer; and the program codes stored in the recording medium are read out and carried out by the computer (or CPU or MPU).

Examples of the recording medium encompass: tapes such as a magnetic tape and a cassette tape; disks such as magnetic disks (e.g., a floppy (registered trademark) disk and a hard disk) and optical disks (e.g., a CD-ROM, an MO, an MD, a DVD, and a CD-R); cards such as an IC card (including a memory card) and an optical card; semiconductor memories (e.g., a mask ROM, an EPROM, an EEPROM, and a flash ROM); and logic circuits such as PLD (Programmable logic device).

Further, the self-propelled vacuum cleaner 1 may be configured to be connect to a communication network, and the program code may be supplied via the communication network. The communication network is not particularly limited, and examples of the communication network encompass the Internet, an intranet, an extranet, a LAN, an ISDN, a VAN, a CATV communication network, a virtual private network, a telephone network, a mobile communication network, and a satellite communication network. In addition, a transmission medium constituting the communication network is not particularly limited, and examples of the transmission medium encompass: wired transmission media such as IEEE1394, a USB, a power-line carrier, a cable TV line, a telephone line, and an ADSL; and wireless transmission media such as infrared rays (e.g., IrDA and a remote controller), Bluetooth (registered trademark), IEEE 802.11 wireless, an HDR (High Data Rate), NFC (Near Field Communication), DLNA (Digital Living Network Alliance), a cell-phone network, and a satellite line, and a digital terrestrial network. Note that the present invention may be also realized by a computer data signal which has the program codes specified with electronic transmission and is embedded in a carrier wave.

The present invention is not limited to the description of the embodiments above, and can be modified in numerous ways by a skilled person. An embodiment derived from a proper combination of technical means disclosed in different embodiments is also encompassed in the technical scope of the present invention that does not deviate the present invention.

REFERENCE SIGNS LIST 1 self-propelled vacuum cleaner (self-propelled electronic device)
10 communication section
12 remote control signal receiving section
14 image capturing section
15 operation panel
20 memory
22 image storing section
24 dust collection operating section
26 running driving section
30 communication network
50 control section
51 housing operation management section (stop instruction receiving section)
52 image transmission processing section
54 image-capturing control section (data control section)
53 image transmission control section (stop instruction receiving section, data control section)
56 command control section (notification section)
57 dust collection control section
59 running control section
100 operation system
1394 IEEE
200A to 200D terminal device
300 communication network
405 setting button display area
430 image capturing screen
431 image display area
432 menu display area

The invention claimed is:

1. A self-propelled electronic device, comprising:
a camera;
a microphone;
a control circuit; and
stop instruction circuitry that provides a stop instruction when operated; wherein
the self-propelled electronic device operates in response to a command transmitted from a terminal device connected via a communication network;
the self-propelled electronic device generates at least one of: image data corresponding to an image obtained with the camera and sound data corresponding to sound obtained with the microphone in response to the command;
the self-propelled electronic device transmits the image data or the sound data to the terminal device via the communication network in response to the command;
when the stop instruction circuitry is operated while (i) the self-propelled electronic device generates at least one of the image data and the sound data, or (ii) the self-propelled electronic device transmits the image data or the sound data to the terminal device via the communication network, the control circuit receives the stop instruction and stops the generation of the image data and the sound data or stops the transmission of the image data or the sound data to the terminal device via the communication network;
when the stop instruction circuitry is operated while neither (i) the generation of the image data and the sound data is performed, nor (ii) the transmission of the image data or the sound data to the terminal device via the communication network is performed, the control circuit ignores the stop instruction; and
when the control circuit receives the stop instruction, (i) the control circuit sets a command non-reception mode in which reception of an operation command from the terminal device is refused, and (ii) the self-propelled electronic device notifies to the terminal device, which has transmitted the command to the self-propelled electronic device, that the command non-reception mode has been set in the self-propelled electronic device.

2. The self-propelled electronic device as set forth in claim 1, wherein:

the stop instruction circuitry includes a button provided on a housing of the self-propelled electronic device; and the stop instruction is received by the control circuit when the button is operated during (i) the generation of the image data and the sound data, or (ii) the transmission of the image data or the sound data to the terminal device via the communication network.

3. The self-propelled electronic device as set forth in claim 1, further comprising a remote controller, wherein:

the stop instruction circuitry includes a button provided on the remote controller; and the stop instruction is received by the control circuit when the button is operated during (i) the generation of the image data and the sound data, or (ii) the transmission of the image data or the sound data to the terminal device via the communication network.

4. The self-propelled electronic device as set forth in claim 1, wherein, in a case where a next command is received from the terminal device which has previously transmitted, to the self-propelled electronic device, the command to perform the generation or the transmission which was stopped on receipt of the stop instruction, the control circuit transmits, as a response, a notification that the command non-reception mode has been set.

5. The self-propelled electronic device as set forth in claim 1, wherein the control circuit includes a CPU.

* * * * *